June 16, 1931.    G. SUNDBACK    1,810,377
METHOD OF MAKING SEPARABLE FASTENER SLIDERS
Original Filed Jan. 27, 1925    2 Sheets-Sheet 1
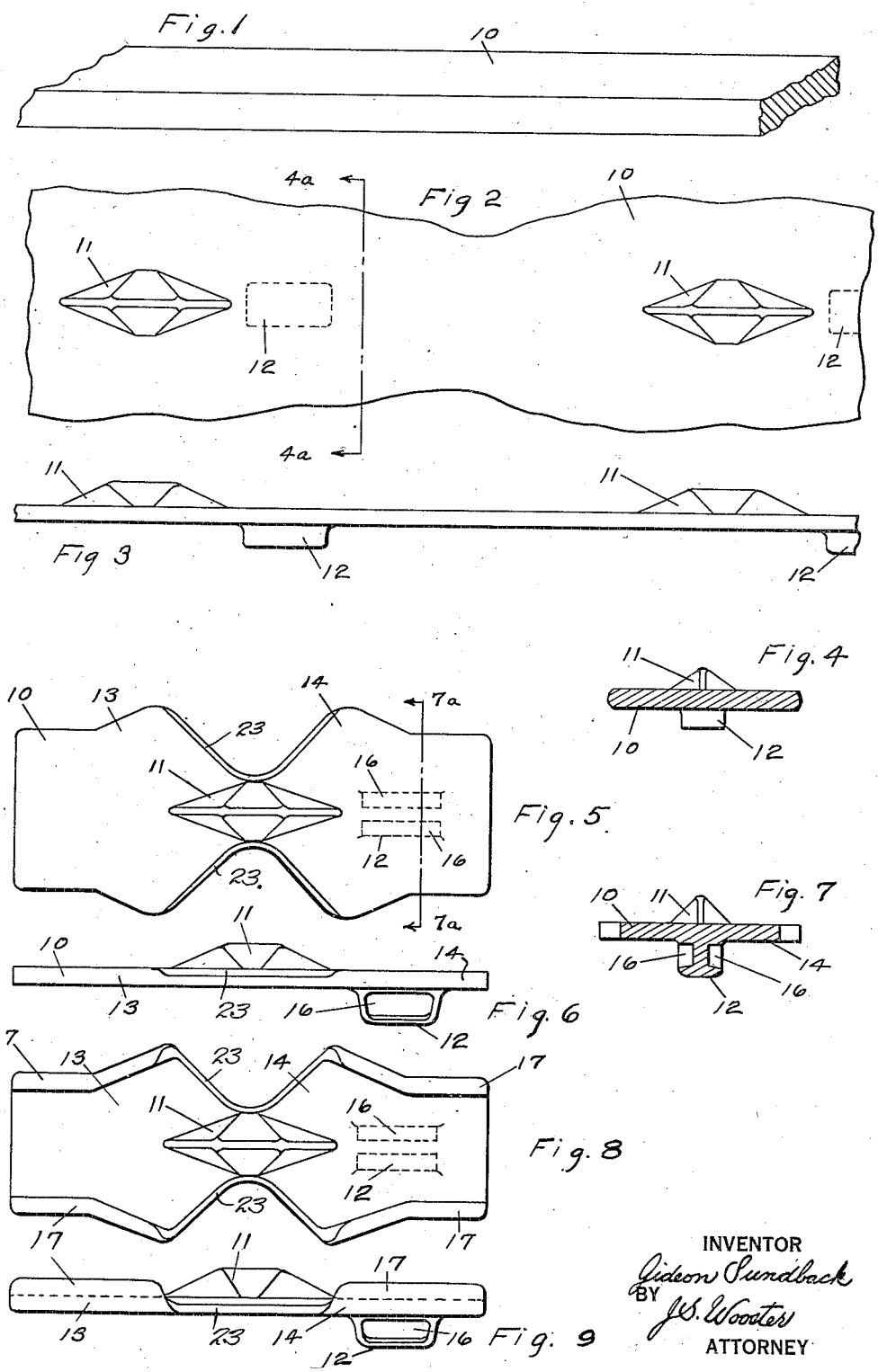
INVENTOR
Gideon Sundback
BY J.S. Wooster
ATTORNEY June 16, 1931. G. SUNDBACK 1,810,377
METHOD OF MAKING SEPARABLE FASTENER SLIDERS
Original Filed Jan. 27, 1925  2 Sheets-Sheet 2
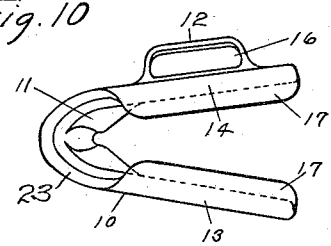
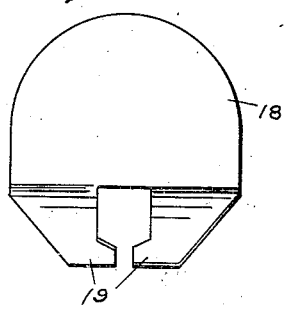
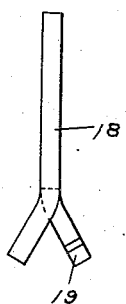
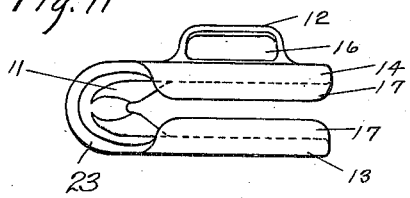
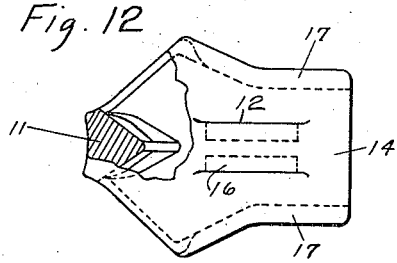
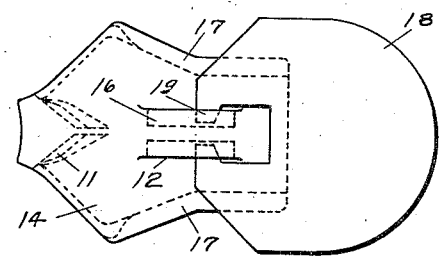
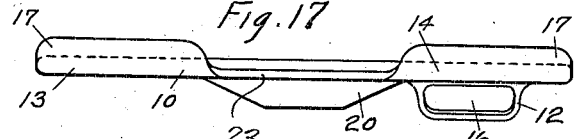
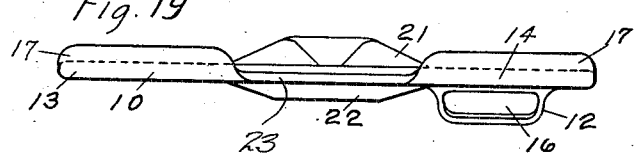
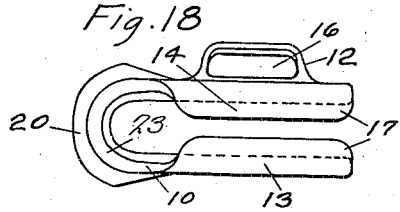
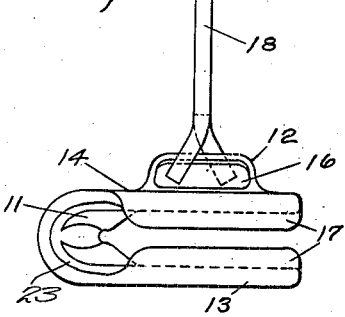
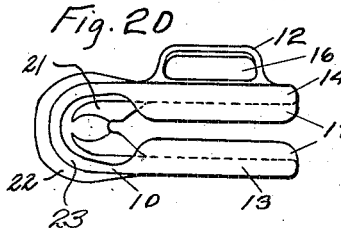
INVENTOR
Gideon Sundback
BY J.S. Wooster
ATTORNEY Patented June 16, 1931

1,810,377

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

METHOD OF MAKING SEPARABLE FASTENER SLIDERS

Original application filed January 27, 1925, Serial No. 5,020. Divided and this application filed March 29, 1927. Serial No. 179,233.

This invention relates to a method of making separable fastener sliders of the type disclosed and claimed in my Patent No. 1,661,144 issued February 28, 1928, of which this application is a division.

Among the objects of the invention are to reduce the cost of manufacturing separable fastener sliders, to facilitate their uniform production in very large quantities, and to construct them of sheet material in one piece instead of several pieces as has heretofore been customary.

A separable fastener slider is subject to severe operating stresses tending to spread it, as when closed under strain, and also often tending to contract it, as in a wringer when it is used on washable goods, so that if a fastener is to be serviceable the slider must be rigid.

One type of slider which is made in large quantities for use in edgewise interlocking fasteners consists of sheet metal wings connected by a bent neck. One or both of these wings are usually provided with inturned lateral edges to form the channels, and these end flanges strengthen the wings longitudinally as far as they extend. With sheet metal sliders, it is necessary to provide stiffening means for that portion between the bent neck and the outer wing corners, and also to provide actuating means. Such stiffening means has heretofore consisted of a rivet passed through the two wings, or through a neck connecting the wings proper to the bend, or has consisted of a U-shaped stiffener interlocked with the neck and extending longitudinally of both wings. In riveted sliders, compression is sometimes opposed by an inside spacer. A U-shaped stiffener interlocked with the wing ends opposes both contraction and expansion. The actuating member or pull device is usually attached to the bent neck or to the U-shape stiffener.

The improved slider disclosed and claimed in my above mentioned patent is made of sheet metal and is provided with integral stiffening means which can be either inside or outside the bend, and is preferably inside. The slider is made short by eliminating the bent neck in favor of a bent thickened reinforce integral with the wings and directly between them, this reinforce connection preferably being V-shaped to provide inner guide surfaces for the diverging channels. This novel integral reinforce stiffens the slider against both expansion and contraction in the most compact manner possible without employing a special rivet because it brings the distorting moments close to the center of the slider. This permits the minimum of metal to be used with maximum strength without any added strengthening part. To enable the actuating device to be attached, one or both wings are provided with an integral projection for attachment of the desired actuating device.

Sliders of this type may be manufactured uniformly and in very large quantities in accordance with the method of the present invention. In one embodiment of this method, strip material of any suitable metal is flattened out to the gauge desired for wing and flange thickness, and the thickened reinforce formed in the same operation. A thickened portion is preferably also left by the same operation on one or both wings to which the actuating device can be pivoted. One or both of these thickened portions act as positioners for placing a strip in blanking out dies which cut out the flat slider blanks. The next operation is to form undercut recesses in the pull attaching lugs on the flat blanks. The next operation is the first bending to bring the wings within, say, about 10° or 20° of parallelism for the purpose of leaving space to insert a forming tool from the end and between the wings to form the channels and the integral reinforce to the desired thickness and cross section for maximum strengthening. The wings are then further compressed to parallelism, thereby completing the slider except for tumbling or other finishing operations and the attachment of the pull device.

The invention will be described in connection with accompanying drawings in which similar reference characters indicate corresponding parts in the several views, and in which:

Fig. 1 shows a strip of metal from which the slider is formed;

Fig. 2 shows the first step in the operation;
Fig. 3 is a side view of the device shown in Fig. 2;
Fig. 4 is a section taken on the line 4a—4a of Fig. 2;
Fig. 5 is a plan view of the device after the wings have been formed;
Fig. 6 is a side view of the device of Fig. 5;
Fig. 7 is a section on the line 7a—7a of Fig. 5;
Fig. 8 is a plan view of the device of Fig. 5 after the flanges have been formed;
Fig. 9 is a side view of the device of Fig. 8;
Fig. 10 shows the slider partially bent into position;
Fig. 11 shows the slider after having been bent to form;
Fig. 12 is a top plan view of the device shown in Fig. 11 and is partly in section;
Fig. 13 shows one form of pull device for the slider;
Fig. 14 is a side view of the pull device of Fig. 13;
Fig. 15 illustrates the manner of attaching the pull device to the slider;
Fig. 16 is a plan view of the completed slider with the pull device attached;
Figs. 17 and 18 illustrate a modification having the integral reinforce on the outside of the wings and bend; and
Figs. 19 and 20 show a construction having the integral reinforce on both the outside and inside of the wings and bend.

According to the preferred embodiment of the invention, the slider is formed from an elongated strip 10 of metal by reducing the thickness of the strip 10 and forming thickened portions 11 on one side by flowing the metal as, for example, with the aid of dies in a manner similar to that employed in coining processes. The projecting lugs 12 are similarly formed on the reverse side, preferably in the same operation in about the location and of the shape illustrated. If each side of the slider is to have an actuating device or pull member, double the number of such lugs are formed at proper places on the same side of the strip 10, so that each wing is provided with an integral pull attaching lug. The wings 13 and 14 of the shape illustrated are next blanked out so as to have them connected by a thickened portion 11, as shown in Fig. 5. The lug 12 is next formed, by means of punches, with recesses 16 on opposite sides thereof, as shown in Figs. 6 and 7. The lateral edges of one or both of the wings 13 and 14 are then bent up to provide flanges 17, as illustrated in Figs. 8 and 9, which serve to guide the slider along the fastener members. Fig. 10 illustrates the next step of bending the wing portions so as to have the thickened part 11 preferably inside the bend and directly between the wings. The wings may be either bent directly to final form, as shown in Fig. 11, or, preferably, the wings are first bent to about the 10° or 20° position shown in Fig. 10 and then subsequently bent to the final form shown in Fig. 11 over dies or forming tools which finally consolidate and form the integral reinforce 11 and give it the desired guiding surfaces in the channels. During bending the reinforce 11 is deformed and compacted. A pull device 18 is blanked out of sheet metal and the attaching projections 19 spread apart, as illustrated in Fig. 14, in order for the pull device to be secured to the lug 12, as illustrated in Fig. 15, by contracting the projections 19. The completed slider is ready for affixing to a fastener after tumbling or other finishing operations. The blanks may be annealed or heat treated between operations, if necessary, but preferably not after the final bending and forming, as the compressed or compacted metal thus obtained is of maximum stiffness and hardness. The marked property of hardening or compacting of non-ferrous metals when placed under compression while cold is thus uniquely taken advantage of to make a slider of maximum strength. As is well known in the art, separable fastener sliders are made of a common non-ferrous alloy known as nickel-silver.

Sheet metal sliders heretofore made have been unduly long due to having a neck extending longitudinally beyond the diverging channels to which a pull device has been connected, or through which the reinforcing means or rivet has been passed. Sometimes an external reinforcing or stiffening means has been used extending along the neck and wings and interlocked therewith. Rivet heads or external stiffening means have caused projections which might tear a fine hose when the fastener is applied to a shoe, as well as interfering with and catching upon the contents of various types of bags or receptacles to which the slider is applied.

When sliders are made according to the method of this invention, the neck portion is done away with and the wings are joined inwardly directly between the inner sides of the diverging channels with the result that the slider length is materially shortened by the absence of a neck portion. The surface of the slider is smooth and free from any projections or external stiffening means because the reinforce to prevent distortion of the wings is located within the bend and between the wings, is integral with the wings, and extends longitudinally from the bend to about or at least a transverse line connecting the outer wing corners. Since the inturned lateral edge flanges of the wings stiffen them, it will be seen that substantially the entire length of the slider is stiffened either by the reinforce between the wings which extends down to about the space where the other reinforce or flanges begin, or by the flanges. The pull device is preferably attached to the recessed integral compacted lug in about the center of one of the wings. This slider is symmetrically reinforced and both wings equally stiffened. Because the metal of the thickened portion 11 is compacted or compressed both in the coining operation of Fig. 2 and the bending operation of Fig. 11, the slider is more rigid than any previous sliders anywhere near its size.

Instead of the reinforce being located entirely on the inside as is preferable, Figs. 17 and 18 show a construction in which the reinforce 20 is located entirely on the outside, and Figs. 19 and 20 illustrate a construction in which the stiffening means 21 and 22 are located both on the inside and exterior, respectively.

The thickened part 11 may be formed in other shapes than that illustrated. The projecting lug 12 may be made as long or as short as desired. When made of short length, the pull device will be pivoted therein without having much play, while if desired the lug may be made longer to allow the pull device to be moved from one end of the slider to the other, according to the direction in which it is pulled.

The entry of the locking members of a fastener into the diverging channels of the slider is facilitated by having the edge of the mouths of the channels beveled at 23 which is preferably done as shown in Figs. 8, 17, etc., before the wings are bent.

Among the advantages of this method may be mentioned the ease and facility with which the slider can be made, all in one piece instead of in several, and instead of using a separately attachable reinforcing member. The slider is adapted for quantity production and to be made from a strip of material, and the dies and punches can be cheaply produced and maintained. Because the reinforce is integral with the wings, it is bent at the same time the wings are bent. The use of forming tools in the completion of the bending operation insures the wings being spaced apart the greater amount and insures the diverging channels being made of the desired shape and clearance, with the reinforce accurately shaped and positioned without the necessity of additional grinding or machining operations for the channels.

The invention is capable of various modifications and adaptations within the scope of the appended claims.

The invention claimed is:

1. The method of making a separable fastener slider which comprises forming a thickened portion on a strip of sheet material, forming wings on either side of said thickened portion, and bending said wings toward each other to compress said thickened portion between them.

2. The method of making a separable fastener slider which comprises reducing relatively thick material to a thin sheet and simultaneously forming a central thickened portion thereon, blanking out slider wings connected by and substantially including said thickened portion, and bending said wings toward each other to compress said thickened portion between them.

3. The method of making a separable fastener slider which comprises forming a thickened portion and a separate projecting lug on a strip of sheet material, forming wings on either side of said thickened portion and including said projecting lug on one of said wings, flanging the lateral edges of said wings, and bending said wings toward each other.

4. The method of making a separable fastener slider which comprises forming a thickened portion on a strip of sheet material, forming wings on either side of said thickened portion, bending said wings toward each other to within about 20° of parallelism, and subsequently bending said wings to parallelism and deforming said thickened portion.

5. The method of making a separable fastener slider which comprises forming a thickened portion on a strip of sheet material, forming wings on either side of and partly including said thickened portion, beveling the edges of the material adjacent said thickened portion, flanging the lateral edges of said wings, and bending said wings toward each other.

6. The method of making a separable fastener slider having diverging channels, which comprises forming a projection on a strip of metal, blanking out a pair of wings connected by and each partly including said projection, flanging the lateral edges of said wings on the side of the blank containing said projection, and bending said projection between the wings to provide diverging channels defined by said projection and said flanged edges.

7. The method of making a separable fastener slider having diverging channels, which comprises forming a projection having guiding surfaces on a strip of metal, blanking out a pair of wings connected by said projection, flanging the lateral edges of said wings on the side of the blank containing said projection, and bending said projection between the wings to bring said wings substantially parallel.

8. The method of making a separable fastener slider having diverging channels which comprises forming a projection having guiding surfaces on a strip of metal, blanking out a pair of wings connected by said projection with said projection extending longitudinally between the lateral edges of said wings, flanging the lateral edges of said wings from the outer end up to said projection, and bending said wings toward each other to form diverging channels defined by said projection and said flanged edges.

9. The method of making a separable fastener slider having diverging channels, which comprises forming a projection having guiding surfaces on a strip of metal, blanking out a pair of wings connected by said projection, flanging the lateral edges of said wings on the side of the blank containing said projection, bending said wings over said projection to within about 20° of parallelism, and subsequently further bending said wings toward each other to give the desired clearance through the diverging channels.

10. The method of making a separable fastener slider having diverging channels, which comprises forming a blank from a flat strip of metal with a pair of wing portions and a projection having sloping sides extending upwardly from the plane of said wing portions, said wing portions being connected by and each partly including said projection, flanging the lateral edges of said wings on the side of said blank containing said projection, and bending said blank about said projection until said wings are substantially parallel and said flanges are directly opposite each other, said projection being bent inwardly between said wings whereby diverging channels are defined by said projection and said flanged edges.

Signed at Meadville, in the county of Crawford, and State of Pennsylvania, this 8th day of March A. D. 1927.

GIDEON SUNDBACK.